May 22, 1951     A. L. PERHAM     2,554,119
STABILIZED RADAR SCANNER EQUIPMENT
MOUNTED ON VEHICLES OF ALL KINDS

Filed June 21, 1945     2 Sheets-Sheet 1

INVENTOR:
Arthur Leonard Perham
BY
Hoguet, Neave & Campbell
ATTORNEYS

May 22, 1951  A. L. PERHAM  2,554,119
STABILIZED RADAR SCANNER EQUIPMENT
MOUNTED ON VEHICLES OF ALL KINDS
Filed June 21, 1945  2 Sheets-Sheet 2

INVENTOR:
Arthur Bernard Perham
BY
ATTORNEYS

Patented May 22, 1951

2,554,119

UNITED STATES PATENT OFFICE 2,554,119

STABILIZED RADAR SCANNER EQUIPMENT MOUNTED ON VEHICLES OF ALL KINDS

Arthur Leonard Perham, Barkingside, England, assignor of one-half to Henry Hughes & Son Limited, London, England, a British limited-liability company Application June 21, 1945, Serial No. 600,712
In Great Britain June 17, 1944

11 Claims. (Cl. 250—33.65)

This invention relates to improvements in stabilised radar scanner equipment mounted on vehicles of all kinds, particularly aircraft, and has for its object to provide simple and robust mechanism of economic weight that will give reliable service.

When equipment of the kind to which this invention relates is installed on aircraft owing to the necessary scope of operation the reflector of radio frequency energy has to project below the lower part of the machine body where it has to be enclosed in a shield, of material transparent to the radiated beam, which must be streamlined, i. e. have a width less than its length, to reduce head resistance.

This invention takes advantage of these requirements by arranging, on the one hand, for the reflector to be swung about an axis passing through the reflector at or about its centre during movement compensating for roll to minimise the transverse movement and rocked about an axis above said centre during movement compensating for pitch to make use of the greater length of the shield and, on the other hand, by mounting the comparatively heavy roll and pitch follow up motors as well as, in some cases, the vertical reference system close to said axis above the centre to reduce the work in moving their mass.

The invention contemplates equipment particularly well suited for installation on aircraft owing to the ease with which the driving and control means can be mounted in the body for ready inspection and servicing and the radiating means can be enclosed within a streamlined shield of reasonable dimensions providing small head resistance.

The invention also contemplates an equipment stabilised under gyroscopic control in which the compensation for roll is only slightly affected by the mass of the gyro assembly, thus enabling a follow-up roll motor of small size, light weight and low consumption to be used.

This invention consists in an improved stabilised radar scanner equipment for mounting on vehicles of all kinds, particularly aircraft, and is characterised in that the movable reflector is stabilised by a vertical reference system about an axis parallel with the roll axis of the vehicle and substantially passing along or near to the axis of the reflector when in the fore and aft position and the aircraft is in horizontal flight as well as about an axis parallel with the pitch axis of the vehicle and located above the centre of the reflector and that the stabilised reflector is enclosed in a shield (of material transparent to the radiated beam) having a width less than the length thereof.

In order that the nature of this invention may be the better understood a construction by way of example will now be described in relation to the accompanying drawings, reference being had to the several figures thereof and the letters thereon, like letters referring to like parts in the different figures in which.

Figure 1:
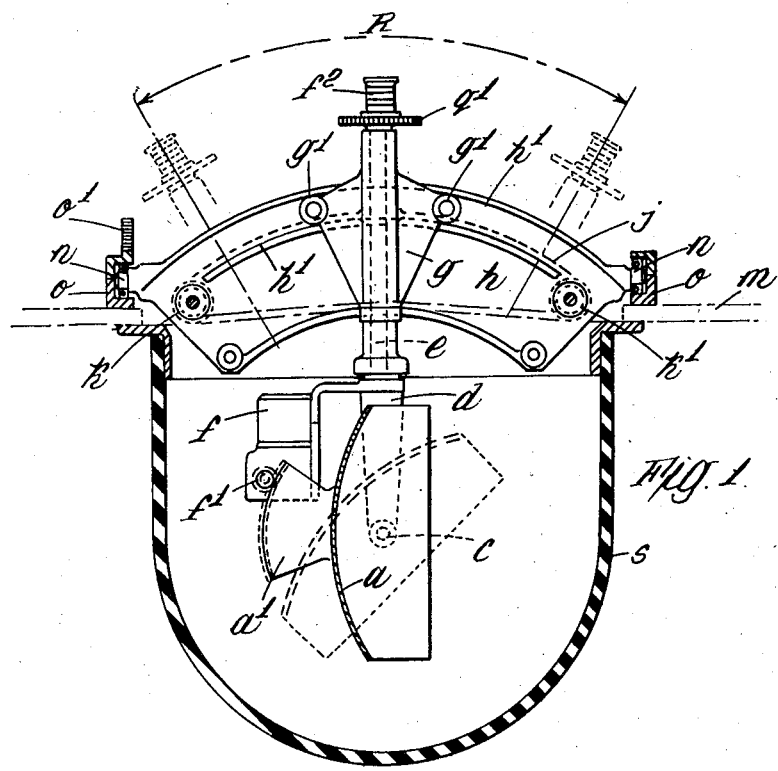
Figure 1 is a front elevation, partly in section, of one form of radar scanner according to this invention taken on the axis 1—2 of Figure 4.

As shown in the drawings the unit comprising the reflector $a$ (that usually is part of a paraboloid) is mounted on normally horizontal pivots $c$ in a frame $d$ having a normally vertical spindle $e$.

The reflector $a$ has a rearwardly projecting toothed segment $a^1$ that meshes with a pinion $f^1$ driven by an electro motor $f$ mounted on the frame $d$, said motor $f$ being remotely controlled through slip rings $f^2$ to tilt the reflector $a$ and its adjuncts as required and as indicated in dotted lines in Figure 1.

The vertical spindle $e$ is journalled in a carriage $g$ having rollers $g^1g^1$ cooperating with the curved tracks $h^1h^1$ of a housing $h$, the carriage $g$ being traversed, to and fro on the tracks $h^1h^1$, to a limited extent, in a plane parallel with the pitch axis of the vehicle, by chain gearing.

Figure 3:
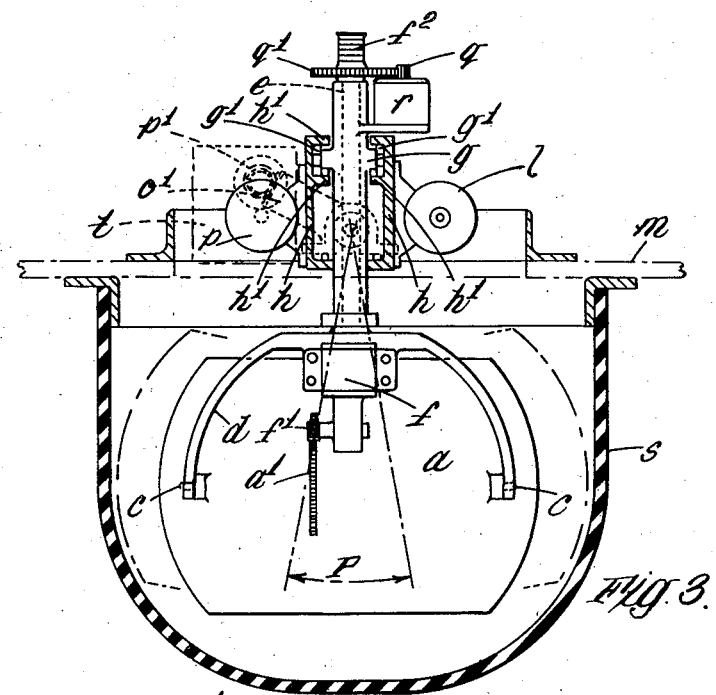
Figure 3 is a side elevation, partly in section, of the radar scanner shown in Figures 1 and 2 taken generally on the axis 3—4 of Figure 4.
Figure 4:
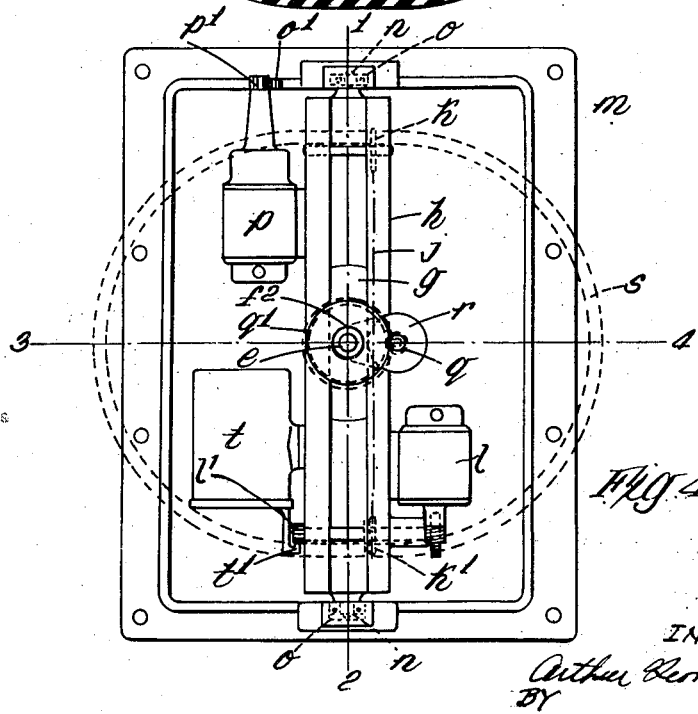
Figure 4 is a plan view of the form of radar scanner shown in the other figures.

To enable this to be done, the two ends of a driving chain $j$ are connected to the upper part of the carriage $g$ and as shown in Figure 1, the chain $j$ is passed over two sprockets $kk^1$, journalled in the housing $h$, of which the sprocket $k^1$ is rotated by an electro-motor $l$, mounted on the housing $h$ as shown in Figures 4 and 3 and operated under the control of a vertical reference system, as explained hereinafter, to swing the carriage $g$ and the reflector $a$, about the axis 3—4 of the reflector and disposed parallelly with the roll axis, through the stabilised roll angle R.

Figure 2:
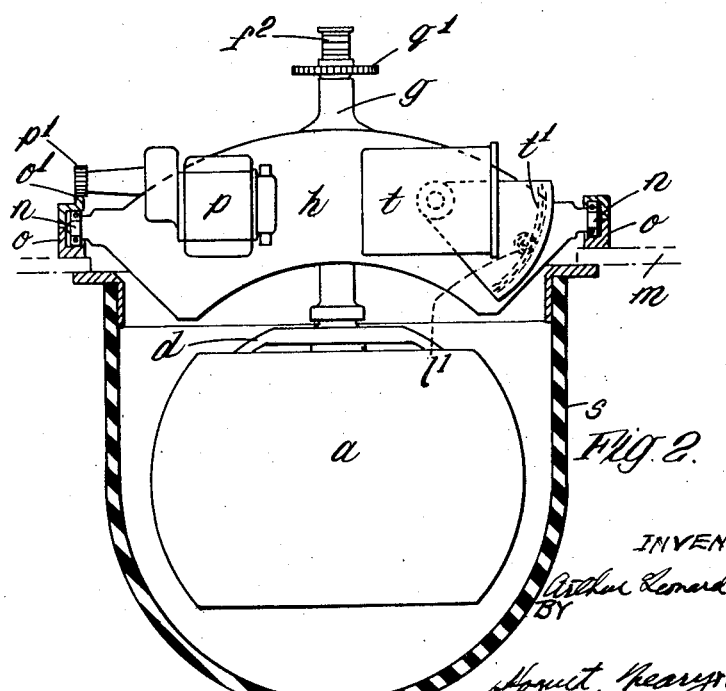
Figure 2 is a front elevation of the radar scanner similar to that shown in Figure 1 but with the reflector turned to face the reader.

The housing $h$ has coaxial pivots $nn$ journalled in bearings $oo$ mounted on the floor (or other suitable part) $m$ of the vehicle and arranged so that the axis 1—2 of the pivots $nn$ is parallel with the pitch axis of said vehicle. This housing $h$ is rocked through the stabilised pitch angle P (see Figure 3) by an electro-motor $p$ mounted on the housing $h$ as shown in Figures 2, 3 and 4, operated under the control of the vertical reference system already referred to, and has a pinion $p^1$ that meshes with a toothed segment $o^1$ mounted on one of the bearings $o$ as shown in dotted lines in Figure 3.

Rotation of the reflector $a$, tilted or not, about the axis of the spindle $e$ at a suitable angular velocity is effected by an electro-motor $r$, mounted on the carriage $g$ as shown in Figures 3 and 4 and having a pinion $q$ that meshes with a gear wheel $q^1$ mounted on the spindle $e$.

By mounting the tiltable and rotatable reflector $a$ so that it can be swung about the axis 3—4 (parallel with the roll axis of the vehicle) that passes through or near to the centre of the reflector $a$ and at the same time by mounting said reflector $a$ so that it can be rocked about the axis 1—2 (parallel with the pitch axis of the vehicle) that is located considerably above the centre of the reflector $a$ it is possible to operate the stabilised reflector $a$ in a narrow streamlined shield $s$ (composed of wind resisting material that is transparent to the radiated beam) and provide for stabilisation during roll through the comparatively large angles such as R (see Figure 1) and during pitch through the comparatively small angles such as P (see Figure 3) that are liable to occur during practical use.

Any vertical reference system of a suitable kind may be used to control the motors $l$ and $p$, such for example as an assembly comprising a gyrostat having a rotor electrically-spun or air-spun about a vertical axis in a horizontal plane, i. e. a gyroscope artificial horizon, a gyro-vertical, or the like having suitable pick-offs mounted on the outer and inner gimbal rings of which one pick-off viz. that on the outer ring, controls the rotation of the roll motor $l$ and the other pick-off viz. that on the inner ring, controls the rotation of the pitch motor $p$ so that when the vehicle (which may be an aircraft) experiences roll and/or pitch, the motors $l$ and/or $p$ are rotated in appropriate directions and to such extents as may be necessary to maintain the axis of the spindle $e$ vertical.

In the construction shown in Figures 2, 3 and 4 of the drawings by way of example, a vertical reference system, having an air-spun rotor has been employed and with the pick-offs is enclosed in the casing $t$.

When the pick-offs are operated directly by the vertical reference system the casing $t$ has to be stabilised for both roll and pitch and to allow for considerable angle (say 60° for example) of roll, the casing $t$ is rotatably mounted on the housing $h$ and is provided with an internally toothed sector $t^1$ that meshes with a pinion $l^1$ fixed on the spindle of the sprocket $k^1$ rotated by the roll motor $l$, so that the horizontal axis of the gyro assembly as a whole is maintained horizontal at all times and incidentally the flexing of the air pipe is reduced to a minimum.

In arrangements when it is inconvenient or unsatisfactory to mount the vertical reference system on the housing $h$, either rotatably or fixedly, the gyro horizon or equivalent assembly may be installed on any suitable part of the vehicle and the roll motor $l$ and pitch motor $p$ may be of the synchronous or step-by-step type controlled by the pick-offs of the gyro horizon in known manner, for instance as is sometimes adopted with naval anti-aircraft gunnery apparatus.

What is claimed is:

1. A scanning device comprising frame means adapted to be mounted in a vehicle, a housing mounted on said frame for pivotal movement about a first axis, arcuate guide means extending along said housing and concentric with a point spaced from said first axis, a carriage mounted on said housing and movable along said guide means, a shaft mounted on said carriage for rotation with its axis extending radially from said point, a reflector having a center mounted on said shaft for pivotal movement about a second axis intersecting said point, said reflector having its center substantially coincident with said point, and means for moving said reflector about said axes.

2. A scanning device comprising frame means adapted to be mounted on a vehicle, a housing mounted on said frame means for pivotal movement about a first axis, a first motor for moving said housing about said first axis, arcuate guide means on said housing concentric with a point spaced from said first axis, a carriage mounted on said housing for movement along said guide means, means including a second motor for moving said carriage along said guide means, a shaft journalled in said carriage for rotation about an axis extending radially from said point, a third motor for rotating said shaft, a reflector for radiant energy having a center, means supporting said reflector on said shaft for pivotal movement about another axis perpendicular to said shaft axis and passing through substantially the center of said reflector, a fourth motor for rocking said reflector about said another axis, and means for actuating said first and second motors for stabilizing said shaft about said first axis and said point.

3. A scanning device comprising frame means adapted to be mounted on a vehicle, a housing mounted on said frame means for pivotal movement about a first axis, a first motor for moving said housing pivotally, arcuate guide means on said housing concentric with a point spaced from said first axis, a carriage mounted on said housing for movement along said guide means, means including a second motor for moving said carriage along said guide means, a shaft journalled in said carriage for rotation with its axis extending radially from said point, a third motor for rotating said shaft, a reflector for radiant energy having a center, means supporting said reflector for pivotal movement about another axis perpendicular to said shaft axis and passing through substantially the center of said reflector, a fourth motor for rocking said reflector about said another axis, a gyroscope, and means controlled by said gyroscope for actuating said first and second motors to stabilize said shaft about said first axis and said point.

4. A scanning device comprising frame means adapted to be mounted on a vehicle, a housing mounted on said frame means for pivotal movement about a first axis, a first motor for moving said housing pivotally, arcuate guide means on said housing concentric with a point spaced from said first axis, a carriage mounted on said housing for movement along said guide means, means including a second motor for moving said carriage along said guide means, a shaft journalled in said carriage for rotation with its axis extending radially from said point, a third motor for rotating said shaft, a reflector for radiant energy having a center, means supporting said reflector on said shaft for pivotal movement about an axis perpendicular to said shaft axis and passing substantially through the center of said reflector, a fourth motor for rocking said reflector about its axis, a gyroscope, means controlled by said gyroscope mounted on said housing for controlling said first and second motors to stabilize said shaft about said first axis and said point.

5. A scanning device comprising frame means adapted to be mounted on a vehicle, a housing mounted on said frame means for pivotal movement about a first axis, a first motor for moving said housing pivotally, arcuate guide means on said housing concentric with a point spaced from said first axis, a carriage mounted on said housing for movement along said guide means, means including a second motor for moving said carriage along said guide means, a shaft journalled in said carriage for rotation about an axis extending radially from said point, a third motor for rotating said shaft, a reflector for radiant energy having a center, means supporting said reflector on said shaft for pivotal movement about another axis perpendicular to said shaft axis and passing substantially through the center of said reflector, a fourth motor for rocking said reflector about said another axis, gyroscopic stabilizing means mounted on said housing for controlling said first and second motors to stabilize said shaft about said first axis and said point, and means for connecting said stabilizing means to said second motor for maintaining said stabilizing means in a reference position.

6. An improved scanning device for mounting upon vehicles subjected to pitch and roll about right angularly related axes, comprising a movable reflector for radiant energy, a movable carriage supporting said reflector and spaced from the plane passing through the center of the reflector parallel to the pitch and roll axis of said vehicle, means supporting said carriage at a point spaced from the reflector for causing pivotal movement of said reflector about a first axis passing substantially through the center of the reflector and parallel to the horizontal plane containing one of the said right angularly related axes of the vehicle, means supporting said reflector for pivotal movement about a second axis parallel with the other of said axes of the vehicle, said second axis being spaced from said center of the reflector, the said reflector thereby being mounted to partake of turning motion relatively to the vehicle about one axis through the center of the reflector and turning motion about the second axis contained in a plane perpendicular to the first and spaced from the center of the reflector, which motions combine to produce an orbit of reflector motion having a length exceeding its width.

7. An improved scanning device for mounting upon vehicles subjected to pitch and roll about right angularly related axes, comprising a movable reflector for radiant energy, a movable carriage supporting said reflector, said carriage being spaced from the plane passing through the center of the reflector parallel to the pitch and roll axes of the vehicle, means movably supporting said carriage for enabling pivotal movement of said reflector about a first axis parallel with the roll axis of the vehicle and passing substantially through the center of the reflector, means supporting said carriage and reflector for pivotal movement about a second axis parallel with the pitch axis of the vehicle, said second axis being spaced from the plane parallel to the pitch and roll axes of the vehicle and passing through the center of the reflector, said reflector thereby being supported by its carriage to partake of combination turning motions relatively to the vehicle about one axis through its center and about a second axis contained in a plane perpendicular to the first and spaced from its center, which motions combine to produce an orbit of reflector motion having a length exceeding its width, and a shield stationary with respect to the vehicle of material transparent to radiant energy enclosing the reflector and closely contoured to accommodate the orbital motion thereof, said shield having a length exceeding its width.

8. An improved scanning device for mounting on vehicle subject to turning motion about a pair of mutually perpendicular axes, comprising a reflector for radiant energy, first means for supporting said reflector, for rocking about an axis passing through the center of said reflector, a second means disposed on an axis passing substantially through the center of said reflector and operative independently of said first means for tilting said reflector about axes coincident with and intersecting said first axis, said first means being spaced from the center of said reflector.

9. In an improved scanning device for mounting on vehicles subject to pitch and roll about mutually perpendicular axes, comprising a reflector for radiant energy, first means for supporting said reflector for rocking about a horizontal roll axis passing through the center of said reflector, a second means disposed on an axis passing substantially through the center of said reflector and operative independently of said first means for tilting the reflector about a horizontal tilt axis also passing through the center of said reflector, said first means being spaced from the center of said reflector, and third means operative independently of said first and second means for tilting said reflector about a horizontal pitch axis spaced from said first and second axes.

10. In an improved scanning device for mounting on vehicles subject to pitch and roll, as claimed in claim 9, including fourth means for supporting said reflector for rotational movement about an axis perpendicular to the said horizontal axes and passing through the center of said reflector.

11. An improved scanning device for vehicles subjected to pitch and roll about right angularly related axes, comprising a movable reflector for radiant energy, a shaft supporting said reflector, means supporting said shaft for pivotal movement about an axis parallel with the roll axis of the vehicle and substantially passing through the center of the reflector, said shaft supporting means being spaced from the plane passing through the center of the reflector parallel with the pitch and roll axes of said vehicle, means supporting said reflector for pivotal movement about another axis parallel with the pitch axis of said vehicle, said another axis being spaced from the center of said reflector, means for stabilizing said shaft about said right angularly related axes, and a stationary shield of material transparent to said radiant energy enclosing said reflector and contoured to accommodate the motion thereof.

ARTHUR LEONARD PERHAM.

REFERENCES CITED

The following references are of record in the file of this patent:

UNITED STATES PATENTS

| Number | Name | Date |
|---|---|---|
| 1,382,174 | Dawson et al. | June 21, 1921 |
| 1,733,531 | Dugan | Oct. 29, 1929 |
| 2,223,224 | Newhouse | Nov. 26, 1940 |
| 2,369,662 | Toulon | Feb. 13, 1945 |
| 2,409,448 | Frost et al. | Oct. 15, 1946 |
| 2,410,831 | Maybarduk et al. | Nov. 12, 1946 |
| 2,412,612 | Godet | Dec. 17, 1946 |
| 2,414,108 | Knowles et al. | Jan. 14, 1947 |

FOREIGN PATENTS

| Number | Country | Date |
|---|---|---|
| 790,418 | France | Nov. 21, 1935 |
| 485,922 | Great Britain | May 25, 1938 |
| 582,257 | Great Britain | Nov. 11, 1946 |